(12) United States Patent
Ros et al.

(10) Patent No.: US 8,406,459 B2
(45) Date of Patent: Mar. 26, 2013

(54) METHOD AND APPARATUS TO MARK A DOCUMENT USING A COMBINATION BETWEEN GUILLOCHES AND WATERMARKING, METHOD AND APPARATUS TO READ PREVIOUS COMBINATION

(75) Inventors: Frederic Ros, Olivet (FR); Christophe Mourtel, Marseille (FR); Teemu Pohjola, Espoo (FI)

(73) Assignees: Gemalto SA, Meudon (FR); Gemalto Oy, Vantaa (FI)

( * ) Notice: Subject to any disclaimer, the term of this patent is extended or adjusted under 35 U.S.C. 154(b) by 277 days.

(21) Appl. No.: 12/747,770

(22) PCT Filed: Nov. 28, 2008

(86) PCT No.: PCT/EP2008/066433
§ 371 (c)(1),
(2), (4) Date: Jun. 11, 2010

(87) PCT Pub. No.: WO2009/074467
PCT Pub. Date: Jun. 18, 2009

(65) Prior Publication Data
US 2010/0260372 A1    Oct. 14, 2010

(30) Foreign Application Priority Data
Dec. 13, 2007  (EP) .................................... 07291518

(51) Int. Cl.
*G06K 9/00* (2006.01)
*G06K 9/36* (2006.01)
*G06K 9/38* (2006.01)
*H04L 9/32* (2006.01)
*H04N 7/167* (2006.01)
*H04K 1/02* (2006.01)
*H04K 1/00* (2006.01)

(52) U.S. Cl. ........ 382/100; 382/168; 382/170; 382/171; 382/232; 382/272; 713/176; 380/210; 380/252; 380/287

(58) Field of Classification Search .................. 382/100, 382/168, 170, 171, 232, 272; 713/176; 380/210, 380/252, 287
See application file for complete search history.

(56) References Cited

PUBLICATIONS

Bas et al ("Robust Watermarking Based on the Warping of Pre-Defined Triangular Patterns", Proceedings of SPIE, vol. 3971, pp. 99-109, (2000).*
Ros et al ("Some Security Strategies for Smart Cards,"Journal of Physics: vol. 77, No. 1, pp. 1-7, (Jul. 2007).*
Bas et al ("Robust Watermarking Based on the Warping of Pre-Defined Triangular Patterns", Proceedings of SPIE, vol. 3971, pp. 99-109, (2000)).*
Pereira et al., "An Iterative Template Matching Algorithm Using the Chirp-Z Transform for Digital Image Watermarking," Pattern Recognition, vol. 33, No. 1, p. 173-175, (2000).

(Continued)

*Primary Examiner* — Amara Abdi
(74) *Attorney, Agent, or Firm* — Panitch Schwarze Belisario & Nadel LLP

(57) ABSTRACT

Guilloches (preventing modification) and watermarking (preventing substitution) technologies are combined to protect a medium, such as a card or a passport. The major idea stems from their dual role for medium authentication: the presence of one is needed to check the validity of the other one. By nature, the guilloche network is visible in the image and easily detectable by image processing. This network is therefore used to generate reference points as elements of synchronization to retrieve watermark information originally embedded in the medium that has submitted an RST transformation. These reference points are by nature stronger than any other means involving invisible templates in the spatial or Fourier space.

10 Claims, 4 Drawing Sheets

PUBLICATIONS

Lefebvre et al., "A Print and Scan Optimized Watermarking Scheme,"Proceedings of IEEE Multimedia Signal Processing, pp. 511-517, (2001).

Ros et al., "Some Security Strategies for Smart Cards," Journal of Physics: vol. 77, No. 1, pp. 1-7, (2007).

P. Bas et al., "Robust Watermarking Based on the Warping of Pre-Defined Triangular Patterns," Proceedings of SPIE, vol. 3971, pp. 99-109, (2000).

F. Ros et al., "An Industrial Watermarking Process for Plastic Card Supports," Industrial Technology, pp. 2809-2814, (2006).

* cited by examiner

METHOD AND APPARATUS TO MARK A DOCUMENT USING A COMBINATION BETWEEN GUILLOCHES AND WATERMARKING, METHOD AND APPARATUS TO READ PREVIOUS COMBINATION

CROSS-REFERENCE TO RELATED APPLICATIONS

This application is a Section 371 of International Application No. PCT/EP2008/066433, filed Nov. 28, 2008, which was published in the English language on Jun. 18, 2009, under International Publication No. WO 2009/074467 A1 and the disclosure of which is incorporated herein by reference.

BACKGROUND OF THE INVENTION

The invention relates to a method and apparatus to mark a document using a combination between guilloches and watermarking, and a method and apparatus to read the previous combination.

Security is one of the highest challenges for "official" documents today. A credential needs to take into account the following factors: physical and data security. Controlled by persons with minimum equipment and motivation, the credential must have sufficient observable security features to allow quick visual verification. Sensitive data stored on the credential need to be encrypted and signed by the issuing authority. The role of a secured system is to improve confidence in verifying the identity of individuals seeking access to physical or virtual locations.

A wide variety of systems require reliable personal recognition schemes to either confirm or determine the identity of an individual requesting their services. All the innovations in this field which are simultaneously relevant for the application context, user friendly, real time and low cost are worth investigating.

Two major tools are used to solve this: guilloches and watermarking.

Fine line graphics, known as guilloche patterns are a traditional anti-copy feature found on most printed documents of any value. As a guilloche consists of a fixed pattern, one can scan a real picture, determine the guilloche pattern and add this pattern on its own picture. After that the attack consists of printing the picture on a "blank" card, with the false personal data. As the picture matches with its cardholder and looks like a valid one, the way to detect the counterfeiting is based on other countermeasures. The below picture illustrates this feature. This countermeasure protects the picture against modification but not against substitution.

Watermarking can be defined as a process that aims at intelligently incorporating a watermark signal (a pseudo random noise) to a host signal in such a way that it can be recovered from the signal mixture while being imperceptible for the human eye. An efficient watermarking scheme has therefore to combine imperceptibility and robustness. To assure robustness, the watermark information has to be incorporated in a redundant way in the host data so that it can be recovered even in the presence of only a small amount of data. Robustness is also dependant on the strength of the insertion. The stronger insertion the better the resistance to different signal attacks. The requirements of robustness naturally conflict with imperceptibility. The trade-off between imperceptibility and robustness is managed by the insertion scheme itself and it is also controlled by the mark effect or degradation on the image. This control is commonly assured by the use of a psycho visual mask aiming at modeling the behavior of Human Visual System (HVS). The watermark signal is often designed in the spatial domain but also in a transform domain like the full-image DCT (Discrete Cosine Transform), the block wise DCT domain, DFT (Discrete Fourier Transform) domain, wavelet domain and sometimes in the fractal domain. The signal embedding is generally done by addition/multiplication or by the use of histograms, mostly in the luminance channel alone, one color channel and less often to several color channels. Some recent works have showed the interest to use the various color spaces in order to minimize the image deterioration after the watermarking stage.

We are interested in the capability of watermarking techniques to decode pictures printed on plastic medium. Several industrial applications related to smart cards could be imagined to improve secure authentication. Watermarking techniques constitute an interesting additional ingredient to cryptography and can be advantageous combined with biometric technologies. In this area, images such as identity pictures have a particular interest, and the study is limited to this image class. In terms of robustness, the specifications for the domain are critically the robustness to printing and scanning attacks as completely integrated into the process and the resistance of the watermark to the card durability (usage along the whole life time), say dithering, scratches, color fading. In terms of perceptibility, the human perception is the unique criterion. It should be also noted that the detection scheme has to be very practical, highly efficient and fast to constitute an acceptable solution.

The main problem with geometrical attacks (global and local distortions) remains the image synchronization before the watermark detection. The mark is decodable only if in a certain way the native numerical format image can be retrieved. There have been a number of synchronization schemes (so-called second watermarking generation techniques) designed to deal with geometrical attacks including the printing and scan process, described in F. Lefebre, D. Gueluy, D. Delannay and B. Macq, "A Print and Scan Optimized Watermarking Scheme." The main known are an exhaustive random search over the space containing the set of acceptable attack parameters, the design of insensitive domains and template insertions, for example described in the following reference: S. Pereira and T. Pun, "An Iterative Template Matching Algorithm Using the Chirp-Z Transform for Digital Image Watermarking."

Today, geometric attacks still pose a great obstacle to the acceptance of image watermarking for practical commercial applications. If many watermarking approaches in the numerical world (internet) are operational, progress is needed to have the same in the digital world (involving hardware transformations for the image).

The watermark has to be retrieved via a simple scanner and some computations. The condition is that the scanned image can be synchronized to the numerical one.

There is no solution capable of matching with all requirements with good efficiency while being fast, secure and imperceptible. The card context is particularly problematic as print/scan attacks seriously affect the original signal and make more difficult the image synchronization.

BRIEF SUMMARY OF THE INVENTION

To solve these issues, the present invention proposes to combine Guilloches technology and watermarking technology by using the guilloche network to synchronize the watermarking embedding. The guilloche network is visible in the image. Particularly the nodes of the network are easily detectable by image processing. They will serve as reference points for the synchronization. Using these points as reference to retrieve the RST transformation is clearly better than other means proposed in the scientific literature where the "templates" or "reference points" are imperceptible. The synchronization for the watermarking is based on the reference points distributed by the guilloche network.

Without the network, it is impossible to synchronize the image and then valid the presence of the watermark.

More precisely, in a first aspect the present invention is a method of producing a marked object, this object is already protected by a network of guilloches, comprising the steps of:
  analyzing the aforesaid network of guilloches
  storing all or part of the points of intersection between guilloches, called reference points in a memory
  subdividing the aforesaid points memorized into at least one sub-group
  storing this subdivision result, called MASK
  application of an invariable triangulation algorithm
  in all or part of triangle thus obtained insertion of a watermarking information.

In a specific implementation, the invariable triangulation algorithm is the Delaunay one.

According to the implementation, the Mask value, and the reference points can be stored in local or distant memories. It can be interesting to store one in local memory, and the other in a distant one.

The present invention is also a method of reading watermarking information embedded in a marked object according to previous writing method, this object is also protected by a network of guilloches, comprising the steps of:
  capturing a picture of this object
  analyzing the aforesaid network of guilloches,
  extracting all or a part of the points given by guilloches intersection in the network, called candidate points,
  graphic synchronization of the support, using reference points and candidate points,
  loading the MASK value
  application of a MASK to recreate at least one sub-group
  application of an invariable triangulation algorithm
  looking for, in all or part of the triangle thus obtained, watermarking information.

In a specific implementation, the invariable triangulation algorithm is the Delaunay one.

In a specific implementation the graphic synchronization of the support can be done by analyzing the rotations, scales and translations.

The Mask value and the reference points can be loaded, according to the implementation, from local or distant memories In a third aspect the present invention is an electronic apparatus to mark an object; this object is already protected by a network of guilloches, comprising means to:
  analyze of the aforesaid network of guilloches
  store of all or part of the points of intersection between guilloches inside a non volatile memory
  subdivide the aforesaid points to create at least one sub-group
  store this subdivision, called MASK
  apply an invariable triangulation algorithm
  in all or part of triangle thus obtained insert a watermarking information.

In a specific implementation, the invariable triangulation algorithm is the Delaunay one.

As for the method, according to the implementation, the Mask value, and the reference points can be stored in local or distant memories. It can be interesting to store a part in a local memory, and the another one in a distant one. If one or both must be stored in distant memories, the writing electronic apparatus must embed means to open a communication with at least one distant electronic apparatus that includes a memory.

In a final aspect the present invention is an electronic apparatus to read a watermarking information embedded in a marked object, this object is also protected by a network of guilloches, comprising means to:
  capture a picture of this object
  analyze the aforesaid network of guilloches
  extract all or part of the points of intersection between guilloches called candidate points,
  load a set of reference points from a memory
  synchronize graphically the support by analyze of the RST, using reference points and candidate points,
  apply a MASK to recreate the sub-groups
  subdivide the aforesaid points memorized into at least one sub-group
  apply an invariable triangulation algorithm
  look for, in all or part of the triangle thus obtained, watermarking information.

In a specific implementation, the invariable triangulation algorithm is the Delaunay one.

In a specific implementation the graphic synchronization of the support can be done by analyze of the rotations, scales and translations.

The Mask value, and the reference points can be loaded, according to the implementation, from local or distant memories. If one or both must be loaded from distant memories, the reading electronic apparatus must embed means to open a communication with at least one distant electronic apparatus that includes a memory.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

A simple application of the above process can be as follows:

Let us consider an identity card comprising an ID picture 1 and a chip. The objective is to add a double protection by watermarking (considered as a stamp) the picture and inserting a visible network guilloche 2 (to prevent any modification). During the personalization phase the original ID numerical picture will be changed two times and printed on the card.

The visible network of guilloches 2 has been printed before starting to implement the current invention.

Figure 1:
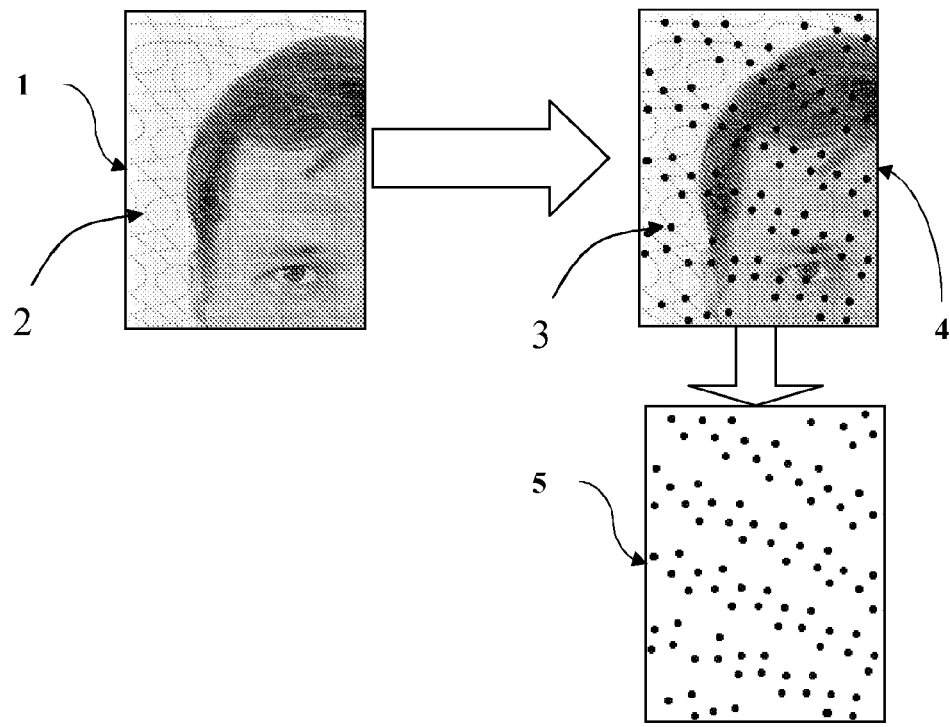
FIG. 1 is a schematic depiction of the analysis of the network of guilloches embedded on a document, and the extraction of the points of intersection between guilloches lines.

FIG. 1 describes the first step of the invention, it is the analysis of the network of guilloches 2, printed on the ID picture 1, to locate all the points of intersection 3 between guilloches. This step allows producing a mapping of these points. This map, called reference points, must be stored. This information will be used to synchronize a candidate picture in the second part of the invention.

Figure 2:
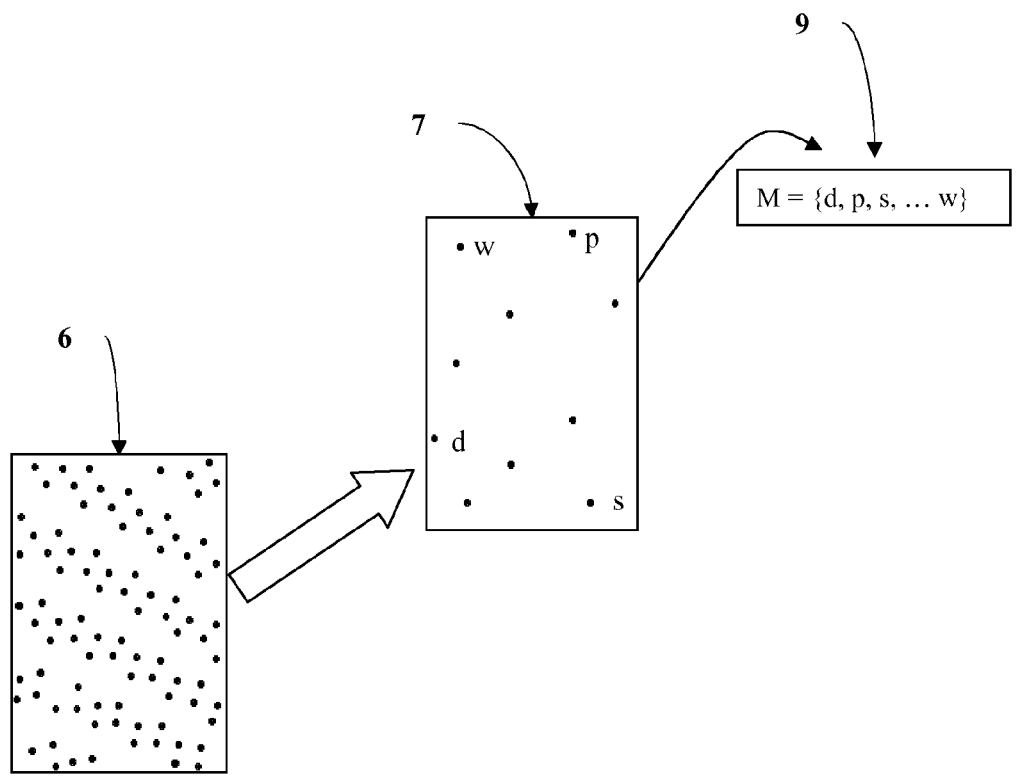
FIG. 2 is a schematic depiction of mask and subgroup creation

In another phase, described in FIG. 2, these points are subdivided into one or several subgroups. In FIG. 2 points 5 are subdivided to generate a subgroup 7. With this information, it is possible to produce a Mask 9, that will be stored. This Mask is sensitive data, because it will be the only map, in the future, to recover embedded watermarking information. In a preferred embodiment, this Mask, with reference points, will be stored inside the chip of the identity card, where can also be stored necessary elements to check the integrity of the guilloche network. Other solutions can be found, for example this mask, with reference points, can be stored on a distant computer.

Figure 3:
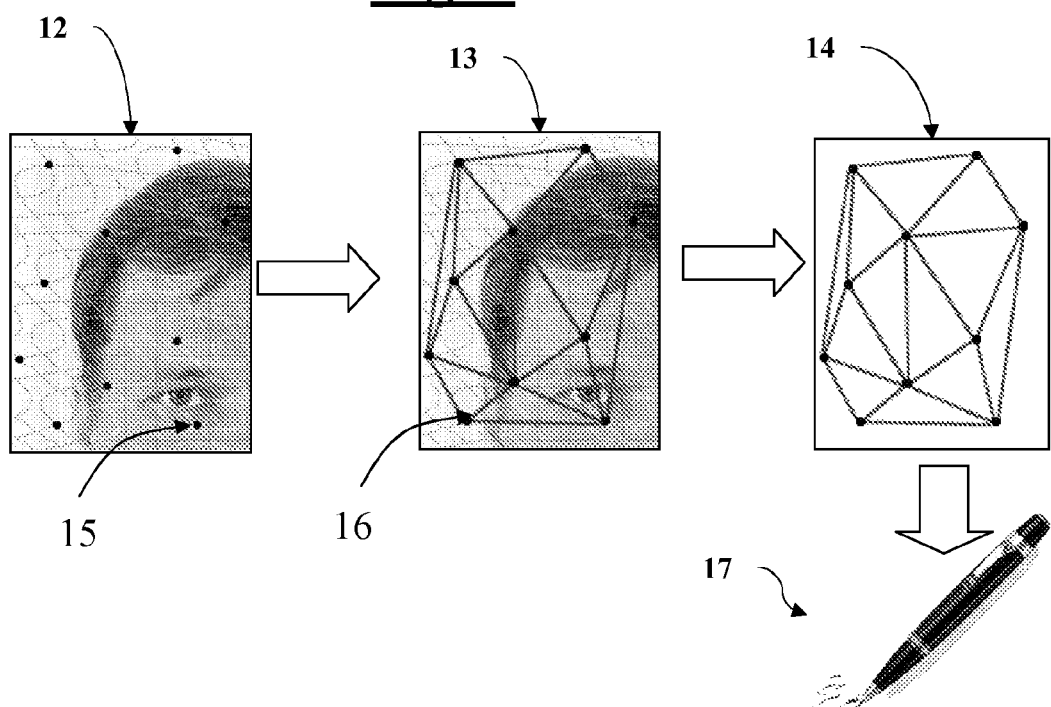
FIG. 3 is a schematic depiction of watermarking information insertion

FIG. 3 depicts the last step of the personalization process:

The points 15 of the subgroup are isolated in the ID picture 1, and an invariable triangulation 16 is done between aforesaid points. This permits obtaining an ID picture with a grid of triangles. The number of triangles is linked with the number of points selected in the subgroup.

In each triangle thus obtained the same information is inserted. In our example, the original watermark embedded can be 10 characters, each of them coded by 8 bits.

An important point is the algorithm used to determine an "acceptable" MASK from a guilloche network. Note that if the network guilloche size is 30, there are 30!/(6!*24!) possible MASKs.

An example of such an algorithm is the following:

The objective of this algorithm is to be able to produce for a list of n points (say 100) representing the guilloche nodes a sub-list of $n_1$ points ($n_1$<n say 6). The main constraint is the following: The corresponding Delaunay triangulation has to provide a list of triangles (seen as a sub image) so that it is possible to watermark a minimum of bits (say 80) in the middle frequencies of each of them (as presented before). The condition is mainly related to the surface triangle and at a lower degree to the frequency contains which can be neglected at a first approximation.

The most basic algorithm form of this algorithm is iterative. It consists of randomly generating $n_1$ points, deducing the triangulation and checking the above surface condition. The process continues until the condition is satisfactory. $n_1$ is defined so that the configuration does exist. Different alternatives exist to optimize this algorithm and reduce its complexity, as for example imposing that each quarter region of the image contains at least one point among $n_1$. Note that the probability to retrieve one give configuration is very weak.

A specific personalization device is needed to implement all these personalization steps according to the present invention. This device must embed several memories to store pictures, intermediate pictures, sets of points . . . etc This personalization device must be able to implement a unique triangulation algorithm, as a Delaunay one. Computation resources are also needed to generate subgroup and Mask.

This computer needs local or distant memories to store Mask and reference points.

This device will also need to insert watermarking information inside identified areas of the picture.

Now the identity card is finished, can be printed and provided to the legitimate user.

When the validity of such a document must be checked, the second part of the invention appears.

For the verification phase, it is necessary to scan the image on the card. This step is very important because, we are in front of an attack called "print/scan attack." This can be defined by the fact that, in a first time, numeric information must be printed, that includes a lot of information alterations, and in a second time, it must be scanned, that includes another time a lot of information alterations.

In the case of an identity card, (or all physical documents), it must be added the fact that the document is wearing out.

That is why it is so difficult to synchronize such documents.

Figure 4:
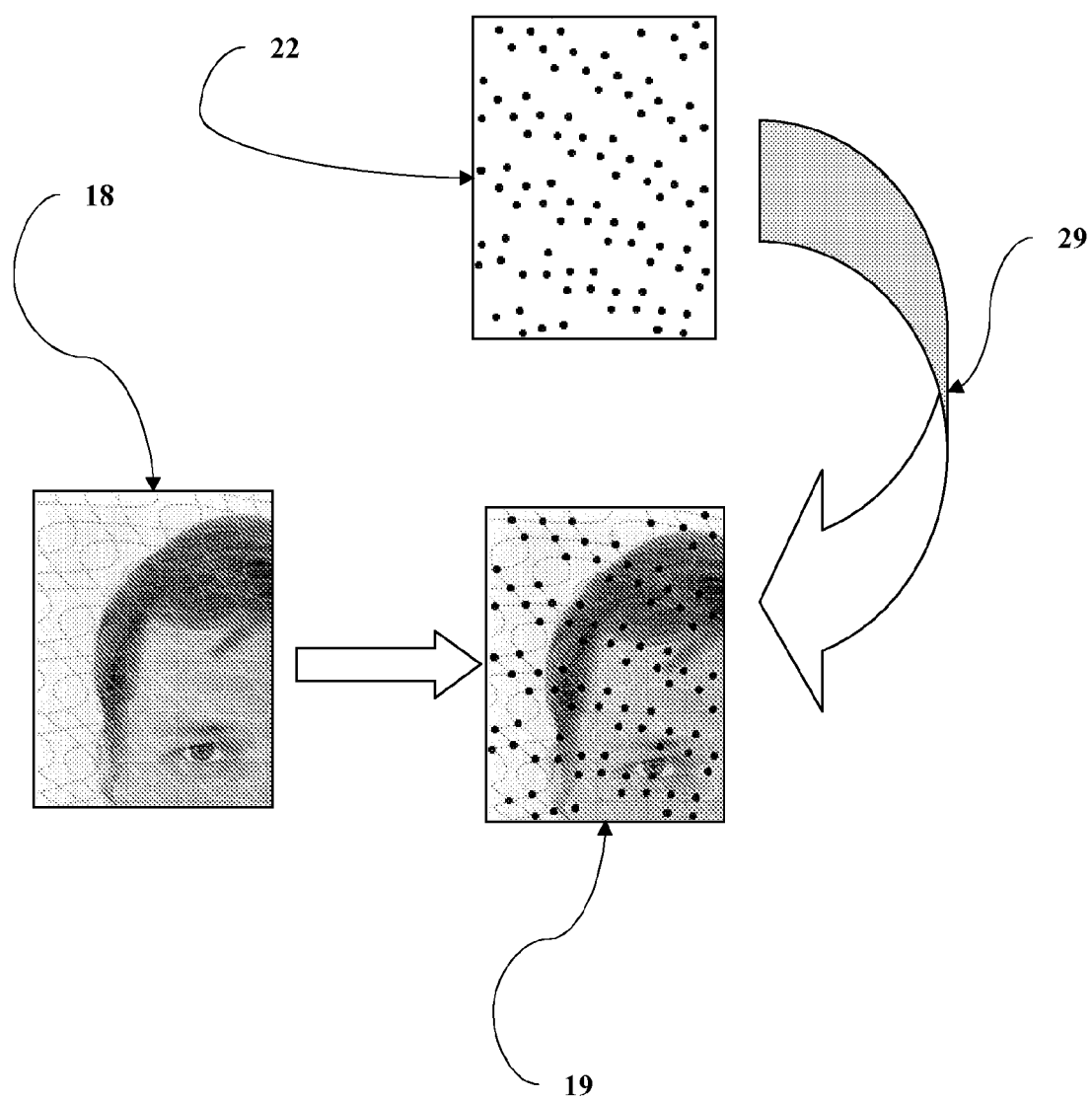
FIG. 4 is a schematic depiction of the analysis and synchronization of a candidate document
Figure 5:
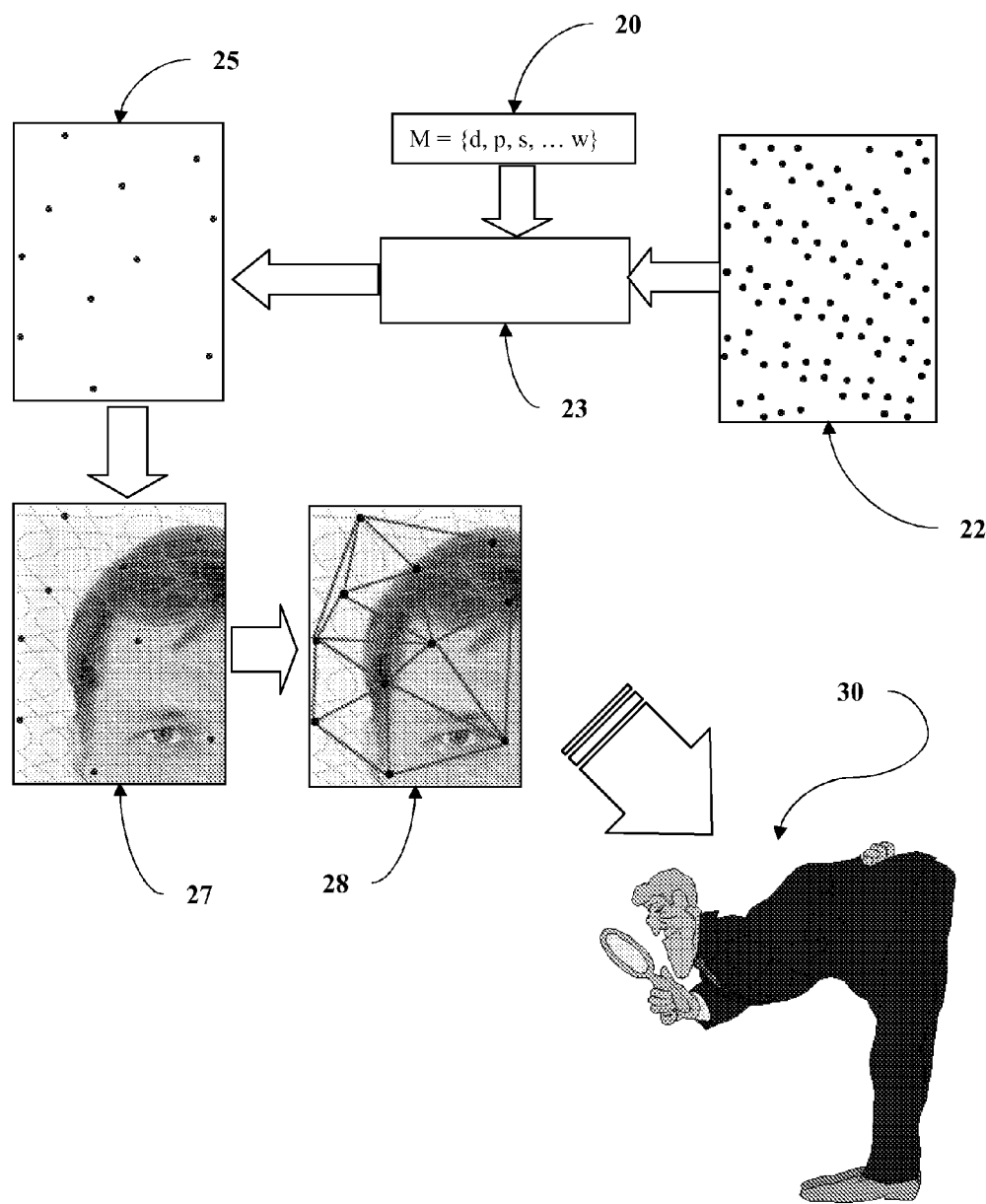
FIG. 5 is a schematic depiction of the watermarking information reading

After scan, as illustrated in FIG. 4, the candidate document 18 must be analyzed, and guilloches must be studied 19. The intersection points between guilloches must be localized 22. These points are called candidate candidates points, and will be called candidate points in the following lines.

The reference points must be loaded. It can be read inside a memory (chip), read on the document body, received via a network, or via other possible means.

Then the candidate points and the reference points must be synchronized 29, it will allow retrieving rotations, scales and translations that have been done by the candidate, from the reference position.

Then it is possible to superpose the numerical and digital pictures 18.

Then, the Mask 20 must be applied 23. The mask can be read inside a memory (chip), read on the document body, received via network, or via every possible means.

This application allows obtaining the subgroups 25 (according to the mask) of points 22. This subgroup will be reported to the picture 27.

Then a unique triangulation algorithm will be applied to obtain a triangulation 28 on the picture.

Then it will be possible to look 30 for watermark information inside all or part of triangles.

Now it is possible to accept the information the first time that it is found, or to require several redundancies for security reasons.

As in writing phase, this reading step must be implemented inside a specific device. This device needs to have a camera (or a scanner), several memories to store pictures, intermediate pictures, sets of points . . . etc, and means to read information, in local memories or in distant ones.

This device must be able to implement a unique triangulation algorithm, as a Delaunay one. Computation resources are also needed to build a subgroup applying a Mask.

This device will also need to read watermarking information inside identified areas of the picture.

In a specific implementation of the invention, the different steps are:

generation of a random number for each card to be personalized. This number can be considered as a secret key S1. The size of S1 is 4*80*2=640 bits. Note that S1 is unique for each card and is kept in the chip.

generation of two random numbers to define two zones of insertion in the middle frequencies (without recovering) to be watermarked. This couple can be considered as a secret key S2.

The DFT (Discrete Fourier Transform) domain of the luminance plan has then been selected to insert the watermark. DFT representation has invariant properties, is rather tolerant to small misalignments, theoretically preferable and rather simple. A small error in retrieving the original Delaunay triangulation will be <<transparent>> using DFT. This is not the case for a spatial insertion, more classic in the numerical world.

The watermark W is coded according to pseudo-random sequences of {−1; 1} and a zero mean value. It is therefore embedded in middle frequency bands ($f_a$, $f_b$) of the DFT module as follows:

$$m'_i = m_i + f \cdot w_i \cdot m_i * \max(m_{j(f_a, f_b)})$$

where $m'_i$ is the magnitude of the modified DFT coefficient, $m_i$ is the original, 'f' is a force parameter to determine the global watermark strength. By weighting by the max, the insertion fits more with the image content. High and low frequencies must be avoided as they are particularly and respectively affected by the print and scan attacks. Two different secret middle frequency bands of similar sizes are considered. They are defined by radii $f_1$, $f_2$, $f'_1$ and $f'_2$ and are determined according to the printer characteristic: $f_1 > f_{low}$ and $f'_2 < f_{high}$ where $f_{low}$ and $f_{high}$ define the low and high acceptable frequency for the current printer. Cards are subject to different kinds of attacks acting in different frequency bands: some durability (color fading, dirtiness) and scan attacks affect more the low frequencies while print and other durability (scratches) attacks affect more the high frequencies (noise, interpolation . . . ). By embedding the watermark at two different middle frequency bands, the idea is to increase the number of chances to recover the watermark assuming that the deterioration is generally distributed. Particularly, this redundancy overcomes high frequency attacks as well as low-pass filter ones.

The watermark strength is set in an adapted way. The objective is to obtain printed versions where the mark can be decodable without being perceptible. The range of acceptable strengths is determined by considering the printer characteristics and results of tests carried out with reference pictures and common plastic supports.

The watermark strength to local image characteristics before reforming the final color watermarked image. This is done by mixing the original image and the temporary watermarked one based on a spatial masking image:

$$i'_w = \text{mask}_w * i_w + (1 - \text{mask}_w) \cdot o_w$$

where $o_w$ is the native luminance image, $i_w$ is the embedded image after the inversed DFT and $i'_w$ the final image. $\text{mask}_w$ is a coefficient energy in the range [0,1] statistically computed. It contributes to the mark imperceptibility by decreasing the mark strength in weak local activity while maximizing the detection reliability.

Then, the further steps are:
  generation of a random number (S3), which determines the mask (6 points for example) and the corresponding Delaunay triangulation.
  generation of the watermark for each triangle by processing the exclusive "or" between original watermark and S1. The first 160 bits of S1 will be used for the triangle 1, the second for the triangle 2, and so on. The same original watermark is used but different bits are watermarked.
  Consider the numerical ID picture I: create I' by adding the guilloche network.
  Consider I' and the MASK. Insert the watermark in the middle frequencies (modules) according to S2. The new image is I".
  Print I" in the card.
  Store S1, S2+the guilloche network+MASK+original watermark in the chip.

For the verification phase, it is necessary to scan the image on the card, read the chip and make some computations.

The different steps are:
  Scan the image on the card via a camera or simple scanner. The obtained image is Id (d for digital).
  Determine the guilloche network that is present in Id. Note that some points can be affected and not determined. Theoretically, only three points are necessary to retrieve the original network. In practice 10 points are needed.
  Read the chip. Apply a numerical algorithm to correlate the guilloche network inserted into the chip and the one detected in Id. The RST transformation is determined via this algorithm.
  Retrieve then the MASK position in Id. According to the RST transformation, retrieve the original format of I".
  According to S1 and original watermark, generate the watermark for each triangle (in fact two marks of 80 bits).
  According to S2 and for each triangle, process the correlation between the generated marks and the module of the Fourier transform of the triangle (at the two locations). If the maximum between the two correlations is more than a given threshold (statistically computed), the triangle is said to be recognized. Otherwise, it is said to be not recognized. If one triangle is at least well recognized, then the card is OK for the watermark part. It should be noted that this decision approach is the simplest. Other more sophisticated ways can be investigated (two or three triangles with medium scores instead of one with a great one for example).

The guilloche network can be analyzed by human eyes but also automatically via image processing. As the guilloche network is known, it can be systematically analyzed: if there is no fraud, each point of the network has to be connected to another one via a continuous line. Even is some points are not well detected, by superposing the numerical network a strong verification can be done.

In a specific implementation, it is possible to create several subgroups, and so to generate a mask that includes the points division between subgroups. According to these implementations all steps linked to a subgroup must be applied to each subgroup. This implementation can be interesting because each subgroup can have specific watermarking information to embed.

Watermarking and guilloche are complementary: with watermarking one can be sure that there is a message hidden inside the image. We rather prevent substitution. With guilloche, we rather prevent image modification. The invention prevents also against guilloche redrawing.

The inventive idea is also robust against scratches and other "natural attacks." This is due to the choice of the insertion space (Fourier domain and middle frequencies) and the redundancy aspect. Scratches affect the high frequencies essentially and colors fading affect the low frequencies. By inserting the watermark in the middle frequencies, the signal is rather well protected against natural card attacks.

Each triangle is watermarked at two locations and the presence on only one is theoretically sufficient for the authentication. Even if some parts of the picture are highly degraded the card can be authenticated.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. A method of reading watermarking information embedded in a marked object that is also protected by a network of guilloches, the method comprising:
   capturing a picture of the object,
   analyzing the network of guilloches,
   extracting all or part of the points of intersection between guilloches, called candidate points,
   loading a set of reference points,
   graphically synchronizing a support using the reference points and the candidate points,
   loading a MASK value,
   applying the MASK value to recreate a sub-group,
   applying an invariable triangulation algorithm, and
   looking for, in all or part of the triangle thus obtained, the watermarking information.

2. The method according to claim 1, wherein the triangulation algorithm is a Delaunay algorithm.

3. The method according to claim 1, wherein the graphic synchronization of the support is done by analyzing rotations, scales and translations.

4. The method according to claim 1, wherein the reference points are loaded from a local memory.

5. The method according to claim 1, wherein the reference points are loaded from a distant memory.

6. The method according to claim 1, wherein the Mask value is loaded from a local memory.

7. The method according to claim 1, wherein the Mask value is loaded from a distant memory.

8. An electronic apparatus to read watermarking information embedded in a marked object, the object being also protected by a network of guilloches, such that the apparatus is configured to:
   capture a picture of the object,
   analyze the network of guilloches,
   extract all or part of points of intersection between guilloches called candidate points,
   load a set of reference points from a memory,
   synchronize graphically a support by analyzing an RST using reference points and candidate points,
   apply a MASK to recreate the sub-groups,
   subdivide the points memorized into at least one sub-group,
   apply an invariable triangulation algorithm, and
   look for watermarking information in all or part of the triangle thus obtained.

9. The electronic apparatus according to claim 8, wherein the triangulation algorithm is a Delaunay algorithm.

10. The electronic apparatus according to the claim 8, wherein a computation apparatus is used to analyze rotations, scales and translations that must be applied to synchronize reference points and candidate points.

* * * * *